United States Patent [19]

Cameron

[11] Patent Number: 5,480,620
[45] Date of Patent: Jan. 2, 1996

[54] CATALYTIC CONVERTER

[76] Inventor: Gordon M. Cameron, 40 Wellesbourne Crescent, Willowdale, Ontario, Canada, M2H 1Y7

[21] Appl. No.: 291,819

[22] Filed: Aug. 17, 1994

[51] Int. Cl.$^6$ .................................................. B01D 50/00
[52] U.S. Cl. .................... 422/171; 422/177; 422/191; 422/181; 422/193; 422/195; 422/192; 422/198; 422/239; 423/532; 423/533
[58] Field of Search ............................ 422/171, 176–177, 422/180, 181, 191, 193, 195, 239, 311, 192, 198; 423/532–533

[56] References Cited

U.S. PATENT DOCUMENTS

| | | | |
|---|---|---|---|
| 4,205,044 | 5/1980 | Gramatica | 422/192 |
| 4,335,076 | 6/1982 | McFarland | 422/171 |
| 5,232,670 | 8/1993 | Cameron | 422/171 |
| 5,302,353 | 4/1994 | Cameron | 422/171 |

*Primary Examiner*—Robert J. Warden
*Assistant Examiner*—Hien Tran
*Attorney, Agent, or Firm*—Cushman Darby & Cushman

[57] ABSTRACT

A catalytic converter for converting sulfur dioxide to sulfur trioxide comprising an exterior shell of a heat resistant weldable metal; foundations from which the shell vertically extends; an interior tube of same metal vertically disposed within the shell and defining a passage; the interior tube having i. a first inlet aperture through which the passage receives a first portion of a sulfur dioxide-containing gas from a source of such gas; ii. a second inlet aperture through which the passage receives a second portion of the sulfur dioxide-containing gas; and iii. an outlet aperture; at least one catalyst bed including an annular bed extending fully between the shell and the interior tube; wherein the annular bed is in direct gaseous communication within the shell with the first passage through the outlet aperture; a plurality of axial heat exchange tubes within the interior tube for conducting hot sulfur trioxide-containing gas from the catalyst bed through the heat exchange tubes to effect heat transfer with and to heat the first and second portions of the sulfur dioxide-containing gas and to cool the hot sulfur-trioxide containing gas; structure for directing the hot sulfur trioxide-containing gas to the heat exchange tubes, and for directing the heated first and second portions of the sulfur-dioxide containing gas through the outlet aperture to the annular bed. The converter offers improved thermal efficiencies and compactness.

5 Claims, 6 Drawing Sheets

CATALYTIC CONVERTER

FIELD OF THE INVENTION

This invention relates to catalytic converters of use for convening sulfur dioxide to sulfur trioxide in the contact process in the manufacture of sulfuric acid.

BACKGROUND OF THE INVENTION

The contact process for the production of sulfur trioxide in sulfuric acid manufacture involves the catalytic oxidation treatment of sulfur dioxide-containing gases from sulfur, or metallurgical or waste acid burning operations. This process uses many stages of heat transfer to colder unconverted gases between and after catalyst beds. In the classic single absorption plant process, there are typically three or four such heat exchange steps, while in the double absorption plant process four to six heat transfer steps may be used. Even in the case where elemental sulfur is the source and the plant uses double absorption, at least two such heat transfer steps are normally involved notwithstanding typically fewer operations involving heat transfer between process gases are involved.

The very large volumes of gases used in such contact process atmospheric pressure plants are difficult and expensive to remove from the catalytic converter and often designers have inserted heat exchangers within the converter to provide the necessary cooling between catalyst beds. The exchangers of interest in such converters have been axially located in a central core or similar portion of the converter with the exchanger being vertically and the catalyst beds horizontally disposed. In such internally combined heat exchange-converter units, the most favoured location for an exchanger is that after catalyst bed number one. Such an exchanger is, thus, known as the "hot exchanger" or "No. 1 exchanger". The hot exchanger transfers heat between the gas leaving the first catalyst bed and the gas entering the first bed. A second exchanger of note is the exchanger after bed 2 in a double absorption process where the heat between beds 2 and 3 is removed to heat the gas flowing to bed 4. The gases being heated in each case are generally already warm from previous exchange steps.

Heat transfer duty is best served using stainless steels as construction materials. With the trend towards use of stainless steels in newer converters, use of stainless steel in the hot exchanger or a reheat exchanger allows a single type of material to be used in the combined exchanger converter. A resultant welded construction is thus possible to offer good protection against leaks.

One prior art combination of a hot exchanger with a single catalyst bed has been used in a number of plants handling metallurgical source sulfur dioxide gases. In this case the catalyst bed is the first bed and the exchanger is the hot exchanger. In this arrangement, a radially symmetrical exchanger is installed vertically co-axial with the central axis of the single catalyst bed which surrounds the exchanger in the form of an annular bed. The incoming gas to the exchanger flows down the tubes of the exchanger and from the bottom thereof flows through a plenum between the shell of the vessel and the bottom of a basket containing the catalyst and the hot exit gas. At the periphery of the converter, the warmed incoming gas passes through an annulus around the catalyst bed to a ring with holes above the catalyst which allows the gas to enter the space above the catalyst. The gas then flows downward through the catalyst bed into a hot plenum and from here flows into the shell side of the exchanger. The gas then flows upward through the exchanger to a top discharge duct which conducts the gas to the next contacting operation.

However, notwithstanding the introduction of aforesaid catalytic converters having an internal heat exchanger in the contact process, there is a need for an improved internal heat exchanger-catalytic converter.

SUMMARY OF THE INVENTION

It is an object of the prevent invention to provide a converter having an internal heat exchanger of reduced physical size to provide greater ease of fabrication.

It is a further object of the present invention to provide a converter having improved overall thermal efficiency.

These and other objects and advantages of the invention will become apparent from upon a reading of this specifications taken in conjunction with the accompanying drawings.

Accordingly, in its broadest aspect the invention provides a converter comprising:

an exterior shell of a heat resistant weldable metal; foundation means from which said shell vertically extends; an interior tube of said metal vertically disposed within said shell and defining a passage; said interior tube having i. a first inlet aperture through which said passage receives a first portion of a sulfur dioxide-containing gas from a source of such gas;

ii. a second inlet aperture through which said passage receives a second portion of said sulfur dioxide-containing gas; and iii. an outlet aperture;

at least one catalyst bed including an annular bed extending fully between said shell and said interior tube; wherein said annular bed is in direct gaseous communication within said shell with said first passage through said outlet aperture; a plurality of axial heat exchange tubes within said interior tube for conducting hot sulfur trioxide-containing gas from said catalyst bed though said heat exchange tubes to effect heat transfer with and to heat said first and second portions of said sulfur dioxide-containing gas and to cool said hot sulfur-trioxide containing gas; means for directing said hot sulfur trioxide-containing gas to said heat exchange tubes; and means for directing said heated first and second portions of said sulfur-dioxide containing gas through said outlet aperture to said annular bed.

By the term "direct gaseous communication is meant that the pre-heated sulfur dioxide-containing gas enters the space above the annular bed directly from the heat exchanger interior tube without prior passing through an outer annular gap around the annular bed.

Thus, the invention allows for split-flow feeding of relatively cool sulfur dioxide gas to the converter prior to pre-heating thereof by hot sulfur trioxide produced in the converter. One stream of this split-flow stream is, preferably, fed from a sulfur dioxide source outside of the converter to the interior tube or "shell space" of the heat exchanger adjacent a divider plate below the catalyst bed and, optionally, the bottom of the converter. This stream, advantageously, provides a cooling effect to this plate and converter bottom and, efficiently, conserves energy.

Accordingly, in a preferred feature the invention provides a converter as hereinabove defined wherein said first annular bed is the lowermost bed in the converter; and further comprising i. a division plate of said metal within said shell below said first annular bed and with said first annular bed defines a space for receiving sulfur trioxide-containing gas from said first annular bed; and ii. means defining a plenum below said division plate; said plenum having a gas inlet opening therein for receiving said first portion of sulfur dioxide-containing gas from said source, and in communication with said first inlet aperture whereby said passage receives said first portion of sulfur dioxide-containing gas.

The invention as hereinabove defined may be provided in further embodiments in multi-bed converters which have further annular beds and/or full beds extending the diameter of the shell.

BRIEF DESCRIPTION OF THE DRAWINGS

In order that the invention may be better understood specific embodiments will now described by way of example only with reference to the accompanying drawings, wherein.

and wherein the same numerals denote like pans and arrows denote gas flows during operation of the process.

DETAILED DESCRIPTION OF PREFERRED EMBODIMENTS

Figure 1:
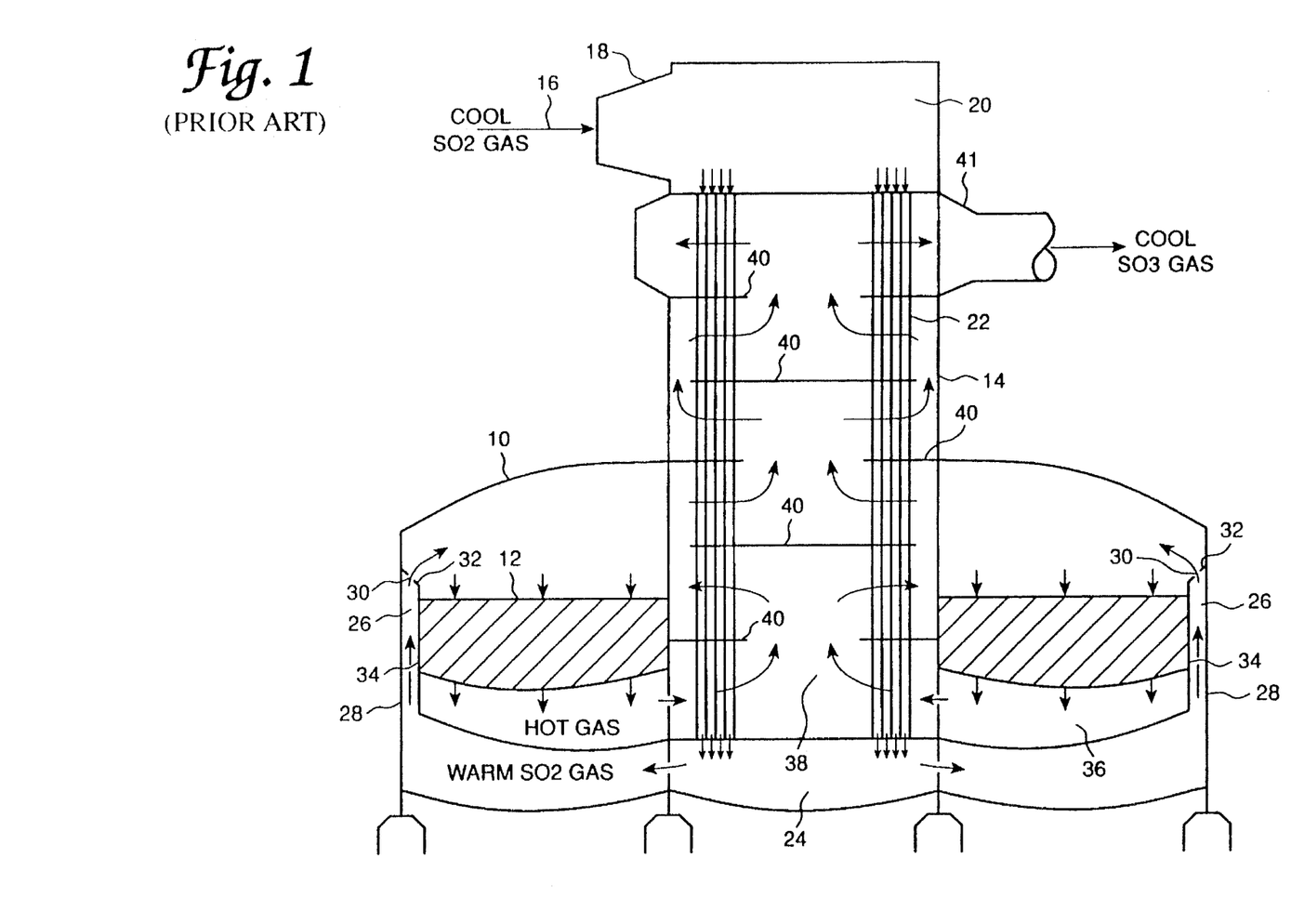
FIG. 1 represents a diagrammatic vertical section of a single catalytic bed converter having an internal co-axially aligned heat exchanger according to the prior art.

FIG. 1 shows generally as 10 a single bed converter having an axially aligned exchanger according to the prior art. Combined catalyst bed/converter 10 holds an annular catalyst bed 12 and an axial heat exchanger 14. Inlet sulfur dioxide-containing gas 16 flows through inlet nozzle 18 to the top vestibule 20 of axial heat exchanger 14 and flows down through tubes 22 of heat exchanger 14 to bottom plenum 24 of converter 10. The hot sulfur dioxide gas is at an appropriate temperature to enter catalyst bed 12 and the sulfur dioxide gas flows radially outward through plenum 24 to annular gap 26 between the outer side of basket 34, holding catalyst bed 12, and vessel shell 28. The gas then flows through holes 30 in truncated cone 32 connecting shell 28 to catalyst basket 34. Hot converted gas enters the hot sulfur trioxide gas plenum 36 which connects to shell space 38 of axial heat exchanger 14. The gas then flows upwardly back and forth across heat exchanger 14 as directed by baffles 40 and leaves heat exchanger 14 through shell nozzle 41 at an appropriate temperature for subsequent processing.

In an alternative prior art embodiment, the converter has an internal bypass in the shell side of the heat exchanger to allow sulfur dioxide gas to bypass the two central passes of the heat exchanger. With the warm sulfur dioxide gas sweeping the bottom of the vessel and the lower shell and the gas entering the space above the catalyst bed from the annulus, heat losses to the foundations are controlled and good gas distribution to the catalyst is reasonably assured.

The heat exchanger shown in FIG. 1 is a radially symmetrical heat exchanger having an empty core and annulus for gas transfer parallel to the tube bundle. Alternative heat exchanger features such as double segmental heat exchangers could be used. Single segmental heat exchanger could also be used but the transfer of gas from the sulfur trioxide plenum to the heat exchanger would pose additional difficulty and any uneven differential expansion between one side of the heat exchanger and the other side could pose mechanical problems.

Figure 2:
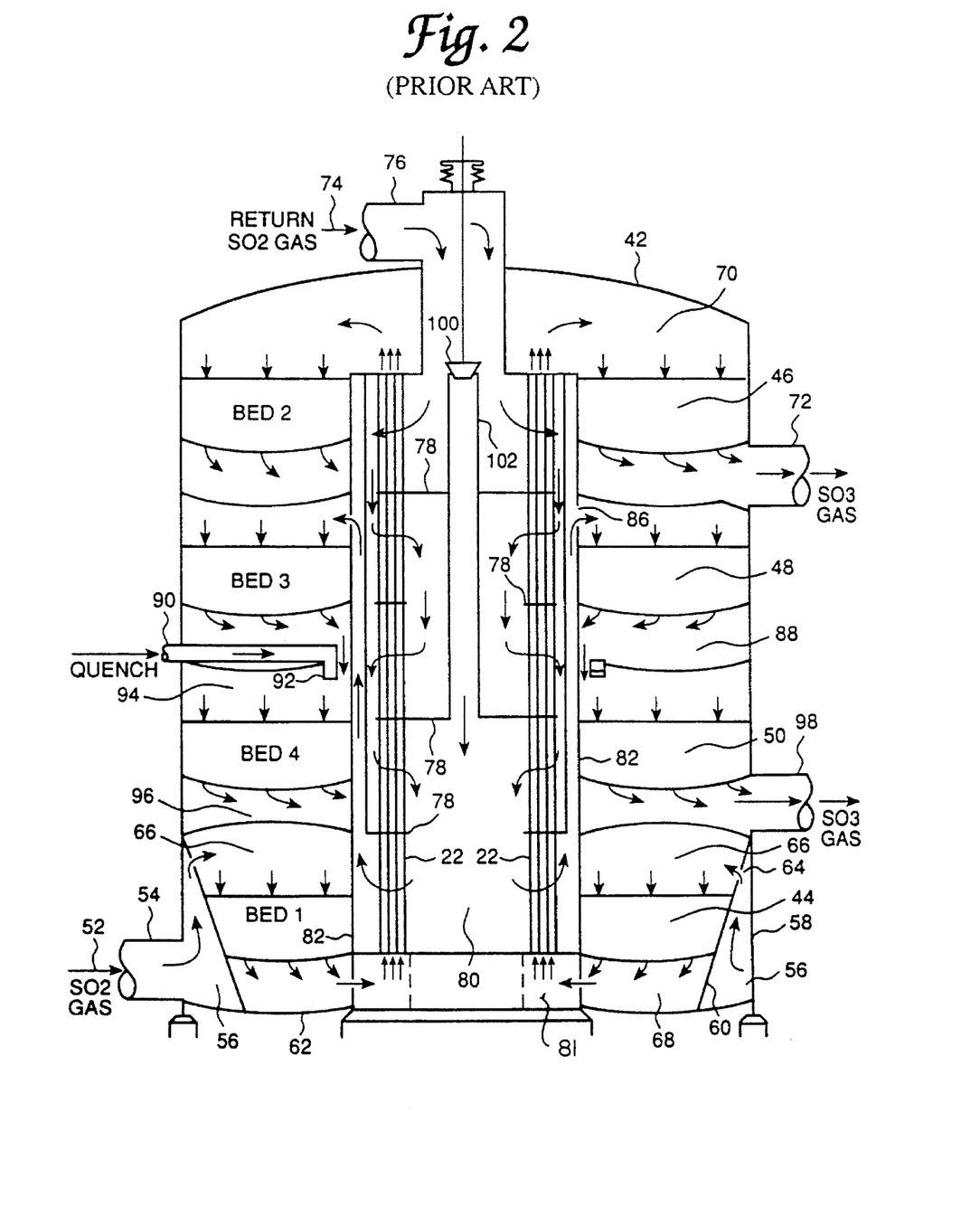
FIG. 2 represents a diagrammatic vertical section of a multi-bed catalytic bed converter having an internal co-axially aligned heat exchanger according to the prior art.

Reference is now made to FIG. 2, which shows generally as 42, a prior art multi-bed converter having an axially aligned heat exchanger. Converter 42 is a right-vertical cylinder containing four annular catalyst beds 44, 46, 48, and 50, with first catalyst bed 44 at a lower pan in a basket separate from the converter shell and having a heat exchanger located in a core tube. In this embodiment, the four beds are associated with a 2:2 double absorption plant with cooling provided by quenching between beds 3 and 4. In this converter, inlet sulfur dioxide gas 52 enters converter 42 through nozzle 54 and flows around the base of the converter in annular space 56, passing between the shell 58 of vessel 42 and a truncated cone 60 tied to vessel base 62 and shell 58. The gas passes through holes 64 in cone 60 into plenum 66 above lead 44 (bed 1) and flows down therethrough. Sulfur trioxide gas formed in the bed flows into plenum 68 below catalyst bed 44 and into the bottom vestibule 81 of heat exchanger 14. From plenum 68 gas flows up through tubes 22 into top plenum 70 and down through catalyst bed 46 (bed 2) and through nozzle 72. Return gas 74 from a separate heat exchanger (not shown) re-enters the converter system through nozzle 76 and enters the shell side of heat exchanger 14 and flows as directed by baffles 78 to the space 80 above bottom tube sheet of heat exchanger 14. The gas flow at this location is directed outwardly and passes up through an annulus between core tube 82 and heat exchanger shell 84 and enters bed 48 (bed 3) through holes 86 in core tube 82. The gas then flows downwardly through catalyst bed 48 to sulfur trioxide plenum 88 and inwardly to an annular space next to the core tube where cold quench gas is added through line 90 and sparger 92. The cooled mixed gas now flows via plenum 94 to fourth catalyst bed 50 (bed 4), to plenum 96, and leaves converter 42 through nozzle 98. An internal bypass valve 100 and bypass tube 102 are provided to regulate the heat transfer in heat exchanger 14.

In this embodiment, the first catalyst bed is located in the bottom of the converter and incoming gas for the first pass cools the outer part of the basket holding the catalyst and then flows inwardly from an annulus to the space above the first bed. This design also requires a core tube for the whole height of the converter and all beds are therefore annular in cross-section. The heat exchanger is designed for total process gas flow on each side.

Figure 3:
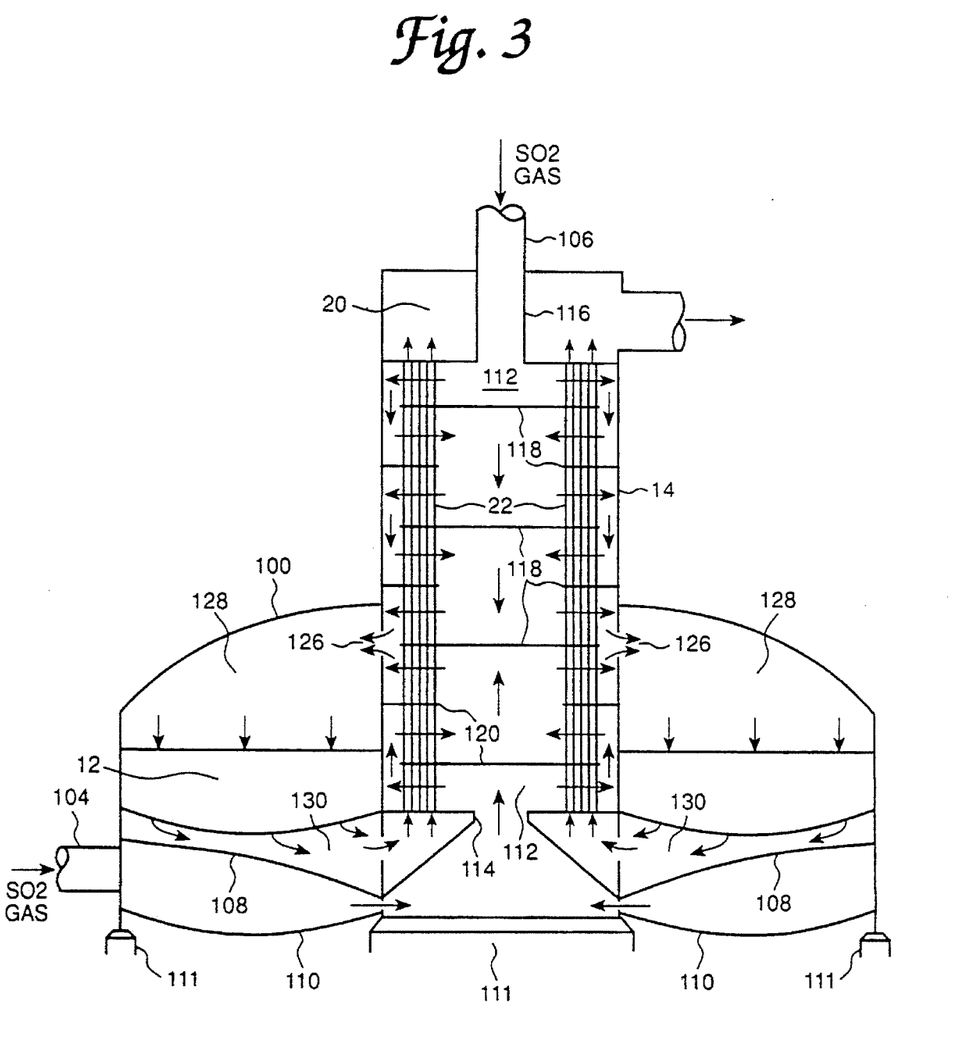
FIG. 3 represents a diagrammatic vertical section of a catalytic bed converter having an internal co-axially aligned heat exchanger according to the invention.

Reference is now made to FIG. 3, which shows a combined single bed converter/axial heat exchanger according to the invention and which represents a significant improvement on the prior art shown in FIG. 1.

Converter 100 contains a single catalyst bed 12 and a heat heat exchanger 14 as common to FIG. 1. Incoming cooled sulfur dioxide gas enters at two locations—lower inlet 104 and upper inlet 106. Nozzle 104 connects with a plenum in the bottom of converter 100 to give a gas sweep of converter bottom 110 and also cooling of division plate 108 between the sulfur trioxide gas leaving catalyst bed 12 and vessel bottom 110—reducing the rate of heat loss and reducing the thickness required of bottom 110 and division plate 108. Converter 100 has foundations 111 which are significantly cooler then those of prior art converters. The slightly warmed sulfur dioxide gas then passes vertically upward into shell space 112 of heat exchanger 14 through a core tube connection 114. The first sulfur dioxide gas stream flows upward as directed by baffles 120. A second sulfur dioxide gas connection 116 connects with shell space 112 of exchanger 14 below the top tube sheet and the gas flows downwardly as directed by baffles 118. This gas joins the flow of the first stream at holes 126 of heat exchanger 14, which communicates with plenum 128 above catalyst bed 12. The sulfur dioxide containing gas flows through catalyst bed 12 and, after conversion to sulfur trioxide, plenum 130 and then up through tubes 22 to top vestibule 20 and from there to the next process vessel (not shown).

Figure 4:
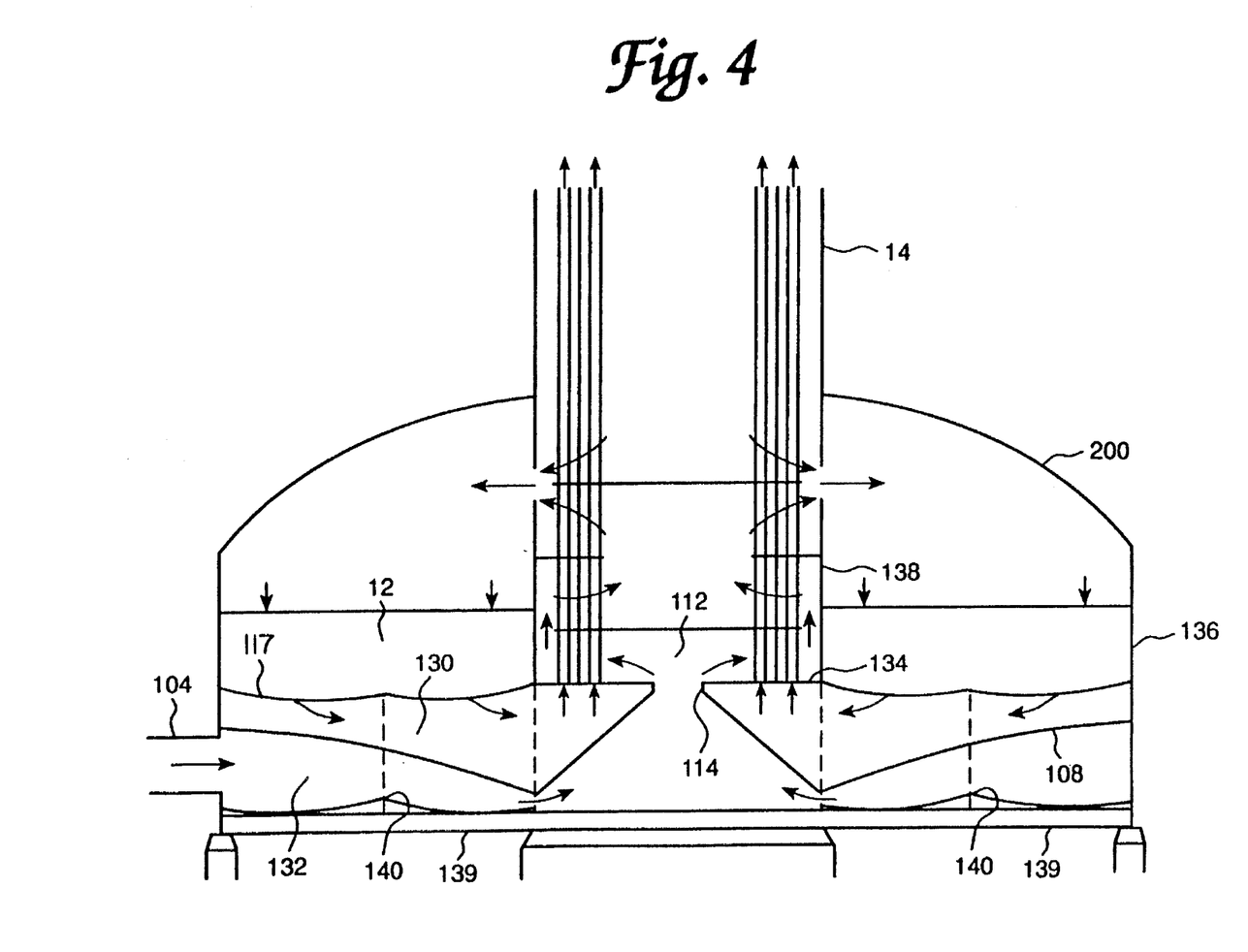
FIG. 4 represents a diagrammatic vertical section of a catalytic bed converter having an internal co-axially aligned heat exchanger according to the invention having an alternative lower catalyst support arrangement to that shown in FIG. 3.

FIG. 4 shows two alternative arrangements for the bottom of the converter shown generally as 200—one with intermediate support between the shell and heat exchanger and a second with no intermediate support.

In FIG. 4, catalyst bed 12 is supported on a pierced concave-shaped membrane 117 which forms the upper boundary of plenum 130. The lower boundary of plenum 130 is formed by divider 108. A second plenum 132, below plenum 130, conducts a part stream of relatively cool sulfur dioxide gas from nozzle 104 to core tube 114 through which it flows to shell space 112 immediately above bottom tube sheet 134. This pan stream can vary significantly in size and can be used to control the heat transfer in axial heat exchanger 14. The quantity of the part stream can also be set to provide a sweep of plenum 132 to provide a cooled bottom for converter 200. The divider membrane 108, between the sulfur dioxide and the sulfur trioxide gases as shown in FIG. 3 is supported at converter vessel shell 136 and heat exchanger shell 138 by a suitably concaveshaped membrane 117 to accept the pressure difference. An alternative structural arrangement has an intermediate ring 140 between vessel shell 136 and heat exchanger shell 138 supported by a steel grillage or similar support 139. Ring 140 supports the shell, divider and membrane 117 supporting catalyst bed 12. Since bed 12 is the hottest and the allowed stresses in the stainless membranes are the lowest of any points in the converter, the intermediate ring offers significant increases in reliability of the first mass support or economies in material thickness. Loads at vessel shell 136 from bed 12 are also reduced by intermediate ring 140. In practice, it has been found that the arrangement described in the first structural alternative is very effective with diameter relationships between shell and core tube (or heat exchanger) of around 2:1. Where high ratios of converter diameter to heat exchanger diameter are obtained by decreasing the heat exchanger diameter, intermediate ring 140 will likely be more effective,. A 3:1 ratio is preferred. For multi-bed designs, the most difficult bed to support is the first bed. Accordingly, the extra support needed for the first bed may not be needed for any additional beds.

Figure 5:
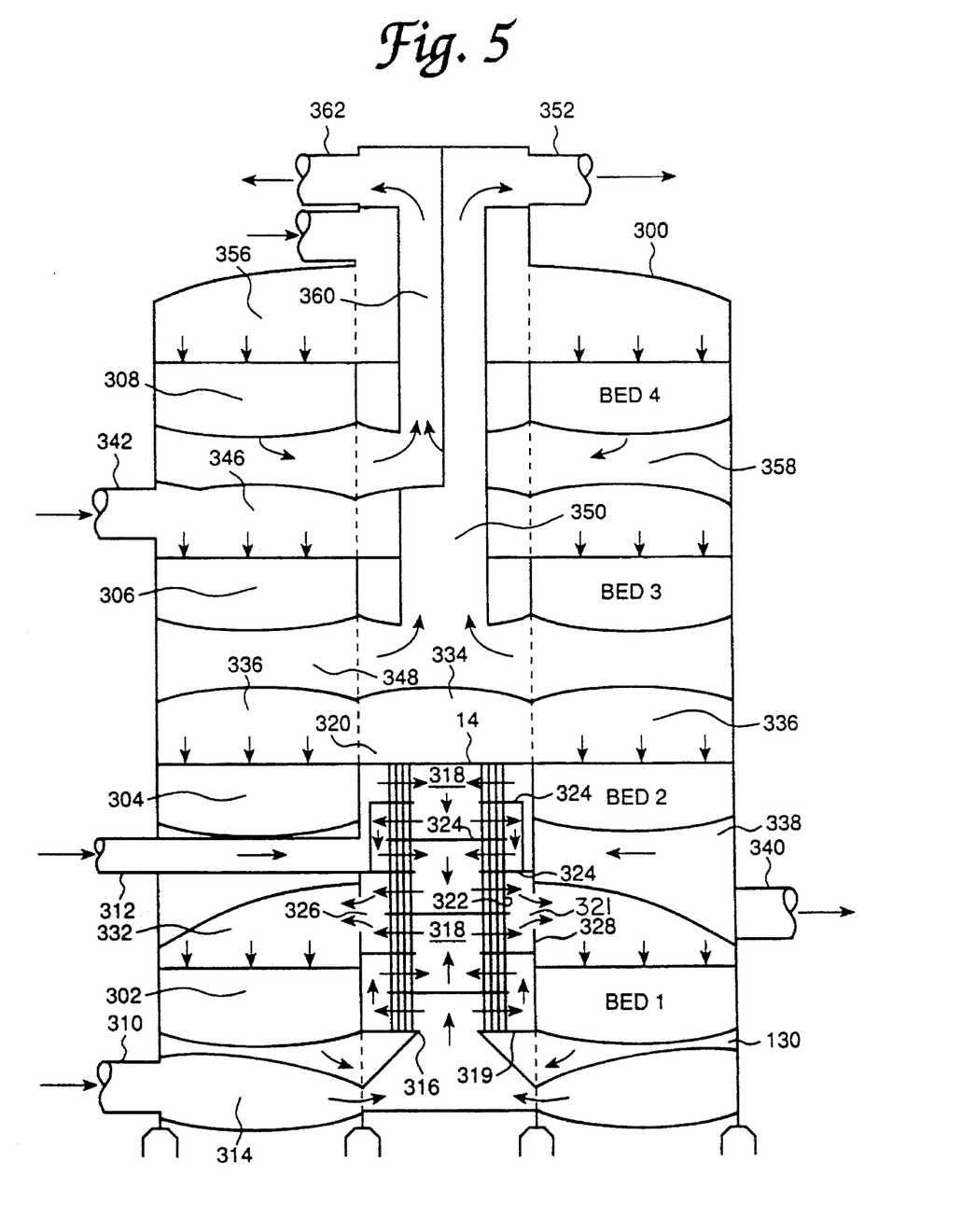
FIG. 5 represents a diagrammatic vertical section of a multi-catalytic bed converter having an internal co-axially aligned heat exchanger according to the invention.

FIG. 5 shows a use of the new arrangement in a multi-bed converter shown generally as 300. Converter 300 contains an internal axial heat exchanger 14 and catalyst beds 302, 304, 306 and 308 which are, respectively, the first to fourth beds. In this arrangement, beds 1 and 2 are separated in flow by internal heat exchanger 14, whereas beds 2 and 3 and beds 3 and 4 are separated by external apparatus (not shown). This embodiment may be used for a single pass four bed converter or for a 2:2 or 3:1 double absorption process.

Inlet gas enters the converter 300 through nozzles 310 and 312. The gas entering through nozzle 310 sweeps plenum 314 and passes through core tube 316 to shell space 318 immediately above bottom tube sheet 319. Gas entering through nozzle 312 enters the shell space immediately below top tube sheet 320 and flows downward across tube bundle 322 as directed by baffles 324. The gas joins the upward flowing stream from nozzle 310 at an intermediate point 326 on heat exchanger shell 328 from which it flows through holes 321 to plenum 332 above bed 302. Combined gases then flow through bed 302 to the sulfur trioxide plenum 130 and up the heat exchanger tubes to upper vestibule 334 of heat exchanger 14 from which it flows to space 336 above bed 304 and then down through second catalyst bed 304. The gas then enters plenum 338 and leaves converter through nozzle 340.

Sulfur trioxide gas which exits the converter through the nozzle 340 is introduced to third bed 306 via plenum 346. Gas leaving bed 3 enters plenum 348 and flows via axial duct 350 to exit nozzle 352.

After the next step of processing outside converter 300, gas reenters converter plenum 356 above fourth bed 308 and flows through to plenum 358. The gas then flows through a second axial connection 360 to exit nozzle 362 and to further downstream processing.

Figure 6:
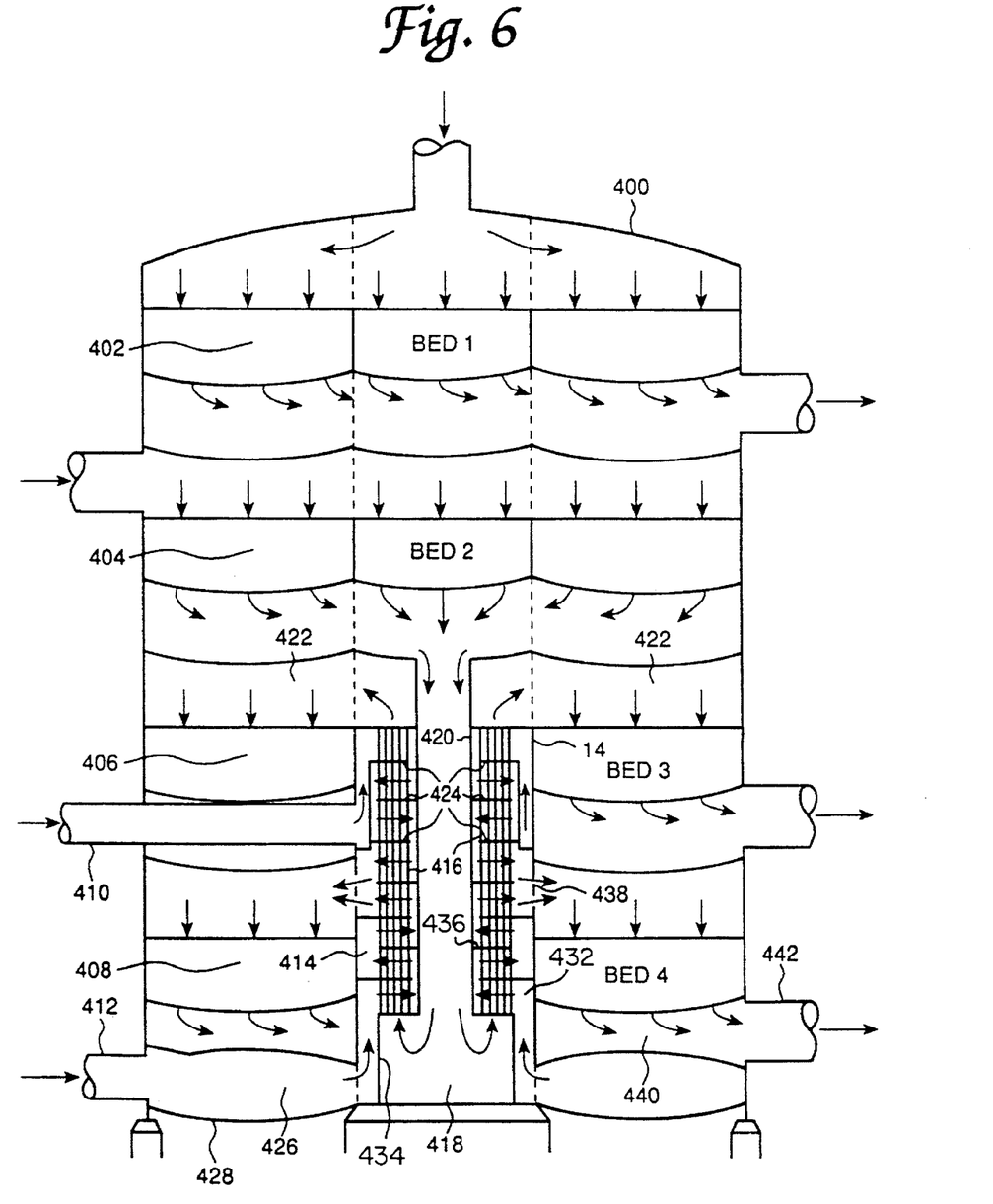
FIG. 6 represents a diagrammatic vertical section of an alternative multi-catalytic bed converter having an internal co-axially aligned heat exchanger according to the invention.

FIG. 6 shows a further embodiment of the invention as a multi-bed converter 400 having beds 402, 404, 406 and 408 arranged from the top, descending in the order 1,2,3,4, respectively, with a 3:1 converter system in a double absorption flowsheet, and a sulfur feed.

In FIG. 6, sulfur dioxide-containing gas 410 from a sulfur furnace and boiler (not shown) is fed to first bed 402 of the converter through inlet 410. Gas flows through a superheater (not shown) to second bed 404 and then through internal axial heat exchanger 14 to third bed 406. The gas from bed 406 flows through external heat exchange equipment to a first absorber (both not shown). From the absorber, the sulfur trioxide-free gas flows through an external heat exchanger (not shown) to internal heat exchanger 14 where it is heated to catalytic reaction temperature and passed to bed 408. The partly-heated gas from the external heat exchanger step enters converter 400 in two streams, 410 and 412, with stream 410 entering the top of shell space 414 in heat exchanger 14 and second stream 412 entering the bottom of shell space 414 of heat exchanger 14. The gas flowing in tubes 416 of heat exchanger 14 is the gas from bed 404, which gas enters bottom vestibule 418 through core tube 420 and flows up through tubes 416 to space 422 above third catalyst bed 406. First shell stream 410 flows down through the shell space as directed by internal baffles 424. Lower stream 412 passes across a plenum 426 in base 428 of converter 400 and enters lower shell space 414 of the heat exchanger 400 through annulus 432 between the shell and the tube side Vestibule 434. The shell side gas flows up through the shell space as directed by baffles 436 and joins the other shell side stream and flows outward through heat exchanger shell holes 438 and into fourth bed 408. The gas then flows to plenum 440 and through nozzle 442 to further processing.

In all of the embodiments according to the invention described hereinabove, the portion of the gas flow passing through the bottom plenum is variable and can be tailored to a modest passage between the divider and the vessel bottom. This keeps the height of the converter down. Further, gas which has to pass through a heat exchanger of the invention before entering a catalyst bed is colder than gas for the bed as in prior art. The heat losses to atmosphere and the foundations are therefore lower. In addition, the strength of the materials in the converter bottom is higher allowing thinner sections to be used. The heat transfer across the diaphragm separating the two gas streams below the catalyst bed is also not insignificant and allows a slight reduction in the size of the internal heat exchanger.

While FIG. 3 shows the incoming gas passing to the shell space through a core entry in the bottom of the converter, it will also be evident that this is not the only type of shell side entry which can be used. Entry to the annular space by a ring of tubes would be possible where an annular bundle is used. If the heat exchanger is based on a double segmental design, two ducts could be used to introduce the gas to the-shell space while for a single segmental design, a single connection would be needed. While the radially symmetrical design is favoured because of the absence of uneven mechanical stresses, other designs can be used provided the stresses are properly allowed for in the mechanical design of the apparatus. It will be similarly clear that the top core entry to the shell space could be from an external duct directly to the shell space as required by the heat exchanger used.

The difference in elevation between the bottom of the catalyst bed and the gas entry to the space above the bed is also in a better relationship than in prior art practice where each stream must flow full length. Also, gas feed from the heat exchanger shell radially outward to the plenum above the catalyst bed eliminates the need for the annular ring of prior art which increases the converter diameter, needs a more complex bed support and basket, and adds to the converter cost. In the instant invention the catalyst bed can be supported from the heat exchanger shell and the vessel shell and the design arrangement allows intermediate support as well.

Variation of the gas flow between streams entering at the two ends of the heat exchanger shell space can be carried out externally giving better temperature control than where an internal bypass is used. Other variations on the theme with a split flow heat exchanger will be clear to those of ordinary skill in the art.

When the full multi-bed converter designs are compared, FIG. 2 versus FIG. 5, a number of differences are seen. First is that the instant invention offers a possible cooling of the whole converter bottom while the prior art FIG. 2 gave only a part cooling. The instant design also uses full converter diameter for the first catalyst bed as opposed to the prior art basket and the heat exchanger visualized only decreases bed area in the first two catalyst beds. In the sketches shown the remaining two beds are essentially full diameter in the top of the converter and can use core entry for one of the beds and core exits for the two beds or the more conventional shell entries of prior art. Where a metallurgical acid plant is involved, the exit gas streams from beds 3 and 4 usually feed large gas heat heat exchangers from the top so top exits are convenient for layout. Radial inlet and exit gas ducts are also usable.

Should the heat exchanger require longer tubes than compatible with the separation between beds 1 and 2 in FIG. 5, or between beds 3 and 4 as shown in FIG. 6, one or both of the other catalyst beds can be convened to annular and placed between the two beds. The use of internal stainless steel axial heat exchangers in $SO_2$ converters is relatively recent in the industry but the data to date indicates that such units when properly designed and kept free of acid mist attack offer very long life. Removal of such a bundle for repair is therefore a low priority issue and locating such a heat exchanger below full diameter catalyst beds is therefore not a serious risk.

For replacement the heat exchanger bundle would need to be cut free of the heat exchanger shell and the beds and divider cores above it removed and then replaced after the heat exchanger has been repaired or replaced. Bed locations are therefore very open to the designer with the exception of the fact that a split flow heat exchanger can be bet used to accommodate a bottom sweep with the bottom bed.

Using split flow will also reduce the diameter of the heat exchanger as the parallel flow spaces in the shell no longer need to handle the full shell side gas flow. Baffle spacings also become closer, giving better tube support. Both tube sheets also see cool gas in the shell space and material strength will be better, allowing thinner materials to be used. The shell side fluid only needs to flow through half of the heat exchanger, possibly reducing shell side pressure losses.

Where shaped diaphragms are used for dividers and catalyst bed supports, the thickness of the material used is a function of the expected temperature and material, the unsupported span and sag in the span and the load on the membrane. The instant invention decreases significantly the separation of the bottom bed and divider from the converter base and allows intermediate supports to be used where economic, reducing drastically the unsupported spans and also cooling at least the dividers.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

I claim:

1. A converter comprising: an exterior shell of a heat resistant weldable metal; foundation means from which said shell vertically extends; an interior tube of said metal vertically disposed within said shell and defining a passage; said interior tube having i. a first inlet aperture through which said passage receives a first portion of a sulfur dioxide-containing gas from a source of sulfur dioxide-containing gas;

ii. a second inlet aperture through which said passage receives a second portion of said sulfur dioxide-containing gas; and iii. an outlet aperture;

at least one catalyst bed including an annular bed extending fully between said shell and said interior tube for converting said sulfur dioxide-containing gas to sulfur trioxide-containing gas; wherein said annular bed is in direct gaseous communication within said shell with said passage through said outlet aperture; a plurality of axial heat exchange tubes within said interior tube for conducting heated sulfur trioxide-containing gas from said catalyst bed though said heat exchange tubes to effect heat transfer with and to heat said first and second portions of said sulfur dioxide-containing gas and to cool said heated sulfur-trioxide containing gas, means for directing said heated sulfur trioxide-containing gas from said catalyst bed to said heat exchange tubes; and means for directing said heated first and second portions of said sulfur-dioxide containing gas through said outlet aperture to said annular bed.

2. A converter as claimed in claim 1 wherein said at least one catalyst bed comprises a plurality of catalyst beds and wherein said annular catalyst bed is constructed and arranged to be first to receive sulfur dioxide containing gas.

3. A converter as claimed in claim 1 wherein said at least one catalyst bed comprises a plurality of catalyst beds and wherein said annular bed is the lowermost bed in the converter; and further comprising i. a division plate of said metal within said shell below said annular bed and with said annular bed defines a space for receiving sulfur trioxide-containing gas from said annular bed; and ii. means defining a plenum below said division plate; said plenum having a gas inlet opening therein for receiving said first portion of sulfur dioxide-containing gas from said source, and in communication with said first inlet aperture to convey said first portion of sulfur dioxide-containing gas to said passage through said first inlet aperture.

4. A converter as claimed in claim 1 wherein said at least one catalyst bed comprises a plurality of catalyst beds disposed one above another within said shell including at least one full catalyst bed extending the full diameter of the converter across an upper part of said shell.

5. A converter as claimed in claim 1 wherein said at least one catalyst bed comprises a plurality of annular catalyst beds disposed one above another.

* * * * *